United States Patent [19]

Ratelband

[11] 4,023,772
[45] May 17, 1977

[54] SLEEVE VALVE COMPRISING A CORE PROVIDED WITH LONGITUDINAL RIBS

[76] Inventor: Johannes Bernadus Ratelband, No. 1, Jan de Jagerlaan, Laag-Keppel, Netherlands

[22] Filed: Mar. 14, 1975

[21] Appl. No.: 558,556

[30] Foreign Application Priority Data

Mar. 14, 1974 Netherlands .................. 7403460

[52] U.S. Cl. .................................. 251/5; 251/61.1
[51] Int. Cl.² ........................................ F16K 7/07
[58] Field of Search ............... 251/4, 5, 9, 61.1; 137/525.3; 312/351; 248/117.2

[56] References Cited

UNITED STATES PATENTS

| | | | |
|---|---|---|---|
| 2,622,620 | 12/1952 | Annin | 251/5 |
| 2,706,612 | 4/1955 | Ratelband | 251/5 |
| 3,145,967 | 8/1964 | Gardner | 251/5 |
| 3,325,138 | 6/1967 | Connolly | 251/5 |
| 3,836,113 | 9/1974 | Johnson | 251/5 |

FOREIGN PATENTS OR APPLICATIONS

| | | | |
|---|---|---|---|
| 1,205,097 | 8/1959 | France | 251/5 |
| 651,039 | 3/1951 | United Kingdom | 251/5 |

*Primary Examiner*—Alan Cohan
*Assistant Examiner*—Richard Gerard

[57] ABSTRACT

A sleeve valve comprising a torpedo shaped core provided with radial, longitudinal ribs, a generally cylindrical sleeve surrounding the core and being made from radially elastically deformable material and a generally cylindrical housing, against which the sleeve is sealed at both ends and in which the core is supported by means of radial supports between each end of the sleeve and the corresponding end of the core at least two approximately radial fins being provided each located between two longitudinal ribs of the core, the contour of said fins facing the sleeve substantially corresponding to the shape the sleeve has at that point in its normally closed state.

13 Claims, 8 Drawing Figures

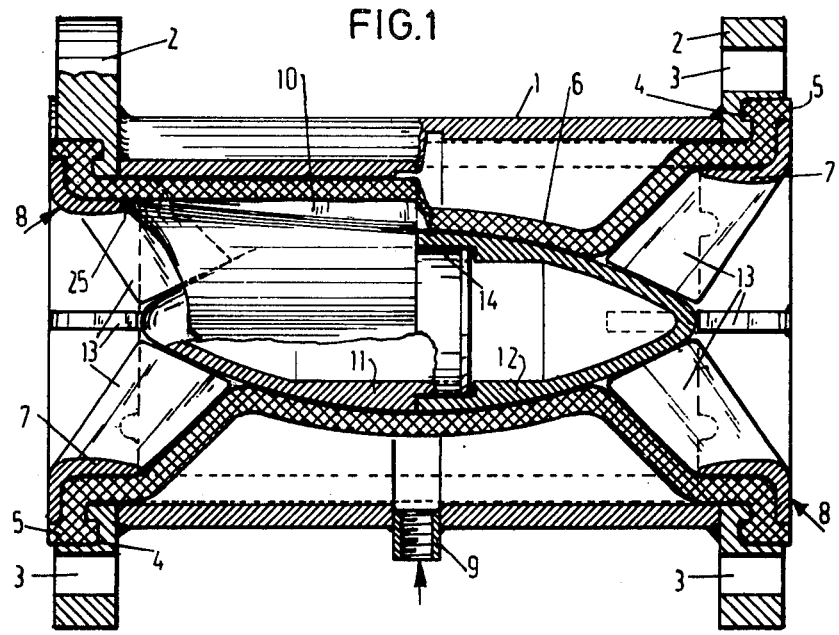
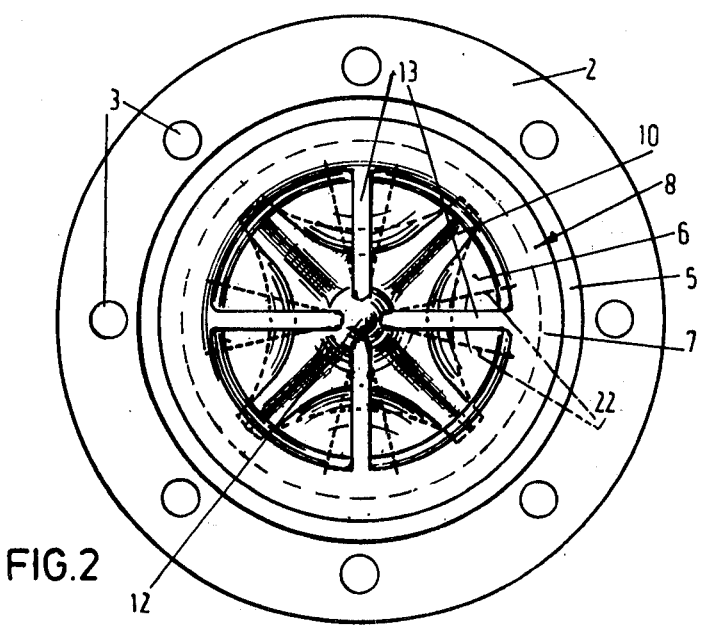

SLEEVE VALVE COMPRISING A CORE PROVIDED WITH LONGITUDINAL RIBS

The invention relates to a sleeve valve comprising a torpedo shaped core provided with radial, longitudinal ribs, a generally cylindrical sleeve surrounding the core and being made from radially elastically deformable material and a generally cylindrical housing, against which the sleeve is sealed at both ends and in which the core is supported by means of radial supports.

Such sleeve valves are known in various embodiments; they can be closed by introducing a pressure medium between the housing and the sleeve whereby the sleeve is moved in a radial direction towards the core, and finally closing the passage between the sleeve and the core.

With the ever increased dimensions of the valves and the increasing pressures of the fluids to be transported, the loads on the sleeves are constantly increasing. In order to withstand these loads it has been proposed to provide the sleeves with reinforcements of textile or a similar flexible material, but this involves an increase in costs and is not always feasible.

The invention provides a different solution of this problem, whilst in addition further advantages can be achieved and it relates to a valve of the kind set forth, which is characterized in that between each end of the sleeve and the corresponding end of the core at least two approximately radial fins are provided each located between two longitudinal ribs of the core, the contour of said fins facing the sleeve substantially corresponding to the shape the sleeve has at that point in its normally closed state.

In this way the sleeve is reliably supported, even if its dimensions are large and/or if it is subjected to heavy closing pressures. These fins may very satisfactorily be arranged on a gland for the sleeve provided with a cylindrical retaining collar. In this case the fins are preferably centrally united and are capable of supporting the core. In this case the core even may be supported solely by means of said structure on either side in the valve, which involves the advantage that the component parts are much simplified and can be made easily by casting or pressure moulding. In this case the core may very satisfactorily be divided in a transverse direction into two parts, which is a facilitation in casting or pressure moulding.

In an advantageous embodiment the fins may, as an alternative, be fastened solely to the ends of the core, the core being supported in the valve by means of the ribs.

The contours of the fins facing the sleeve substantially correspond to the shape the sleeve has at that point in its normally closed state, that is to say without strong deformations due to extremely high pressures, and are preferably at an angle of 15° to 60°, particularly 40° to 50° to the centre line of the valve. Said contours may be both straight and curved.

As a matter of course, in the event of large valves having very large arc distances between the longitudinal ribs more than one fin may be arranged between adjacent ribs.

The fins may be used additionally for supporting one or more resilient bars, said bars bearing against the inner surface of the sleeve and preventing fluttering, that is to say vibrating of the sleeve in its partly closed condition. To that end at least two corresponding fins at both ends of the valve are recessed at the side remote from the core and adjoining the sleeve, said recesses being arranged in longitudinal direction of the valve. In each of said recesses an extremity of a practically straight bar of resilient material is accommodated, said bar extending between the sleeve and the core. For obtaining an acceptable tightness of the closed valve the core preferably has been provided with a longitudinal recess radially inward from each bar for accommodating said bar if the valve is closed.

Said bars preferably are made from stainless spring steel.

The invention will be described with reference to the drawings, in which some preferred embodiments are shown.

FIG. 1 is an axial section through a sleeve valve in accordance with the invention.

FIG. 2 is view in axial elevation of the valve shown in FIG. 1.

Figure 3:
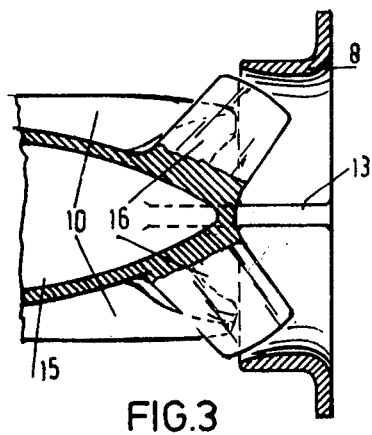
FIG. 3 is partly an axial section through a core and a gland connected with the former by fins in a modified embodiment.

The sleeve valve shown in FIGS. 1 and 3 comprises a cylindrical housing 1, having at both ends connecting flanges 2 with holes 3 for receiving bolts. The two flanges 2 have circular grooves 4, accommodating correspondingly shaped sealing collars 5 of a sleeve 6 having a cylindrical shape in the rest state. These sealing collars 5 are each enclosed by means of a gland 8 provided with a cylindrical retaining collar 7 directed towards the other end of the valve, said gland clamping tightly the corresponding collar 5, when the valve is fastened between flanged connecting ducts. These collars 5 serve in addition as seals.

The sleeve 6 in its rest position, that is the opened state of the valve, is bearing on the inner surface of the housing as indicated by dotted lines in FIG. 1. By introducing a pressure medium, for example, compressed air, through the fitting 9 between the housing 1 and the sleeve 6, said sleeve is moved radially inwards against the pressure of the fluid flowing through the valve and without appreciable extension it engages a core 11, 12 having radial longitudinal ribs 10 and arranged concentrically in the housing 1 and kept in place by means of radial supports such as the fins 13, which are connected to a gland 8. In this state as shown in FIG. 1 the valve is closed. The core in the preferred embodiment shown in FIG. 1 is divided in a transverse direction into two portions 11 and 12. The portion 12 is provided with a cylindrical sleeve 14 fitting in the open end of the portion 11. The torpedo 11, 12 in the embodiment shown can be more readily manufactured, particularly by pressure moulding than in the undivided state.

The sides of the radial supports 13 facing the sleeve 6 more or less correspond to the smooth shape the sleeve has at this place in its normally closed state without appreciable extension, that is to say when the pressure differences on both sides of the sleeve 6 are moderate. If the force exerted by the pressure medium on the outer side of the sleeve, either as a result of the high pressure thereof or of a large surface of the sleeve or both, the sleeve cannot be drastically deformed or torn up, since the radial fins 13 will locally support the sleeve 6. The passage is hardly reduced by said fins.

This supporting function of the radial supports can be accomplished generally by fins extending substantially in a radial direction and fastened to the core or to a gland or to both. The core may as an alternative be supported in the valve by means of the longitudinal ribs, in which case the ribbed core and the sleeve may be integral.

FIG. 3 shows the case in which the core 15 is provided near the end with separate fins 16, which are diametrically opposite one another and which have a free end. In a transverse direction thereof two radial supports 13 also form such fins, however, without a free end and being connected with the gland 8.

Figure 4:
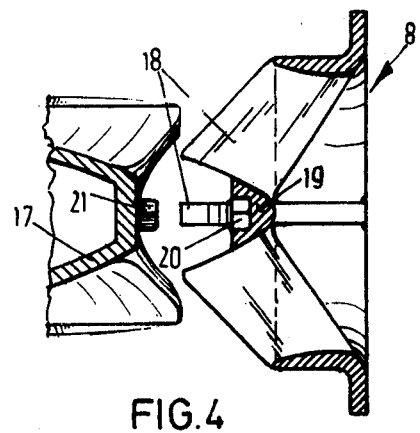
FIG. 4 is partly an axial section through a core and a gland having fins in a modified embodiment.

FIG. 4 shows a core 17 and the associated gland 8 in an embodiment which can be manufactured in a simple manner. The gland 8 has radial fins 18 united centrally by means of a thickened part 19 having a square hole 20. The core 17 has a complementary shape at the end and is provided with a square-section pin 21 so that the core and the gland cannot rotate relatively to one another and will be maintained in such relative positions that always one fin is located between two longitudinal ribs of the core.

In FIG. 2 the dotted lines 22 indicate how in the event of particularly high pressure differences or large arc distances between the longitudinal ribs two fins instead of a single support 13 can be arranged between two adjacent longitudinal ribs 10.

Figure 5:
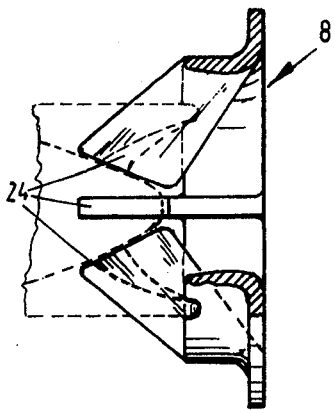
FIG. 5 is an axial section through a gland with vanes in a further modification.

FIG. 5 is an axial sectional view of a separate insert by means of which existing sleeve valves can be adapted to higher pressures. The gland 8 is provided with radial, inwardly inclined fins 24, whose free inner ends leave a space for accommodating the end of a torpedo shaped core, which is indicated by a broken line, the outer contour of said fins having the shape described above for supporting the sleeve.

Figure 6:
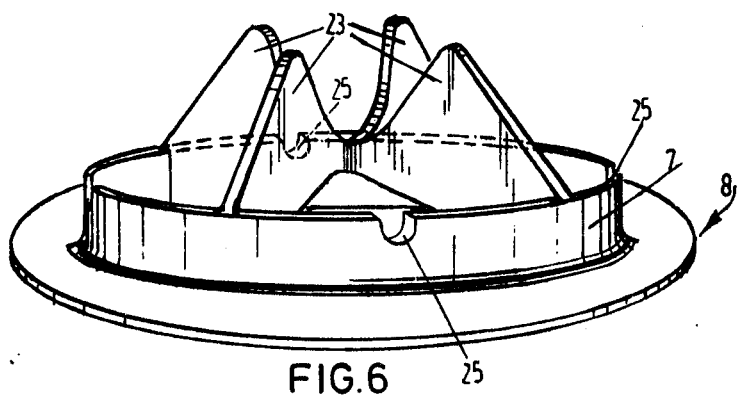
FIG. 6 is a perspective view of a gland provided with centrally united fins.

FIG. 6 is a perspective view of a slightly modified embodiment of the vaned gland shown in FIG. 5. The vanes 23 are in this case centrally united so that greater rigidity is obtained and the core is better safeguarded from an axial displacement. In order to arrange and to keep the gland 8 in the correct position relative to the core, that is to say, with each fin 23 being invariably located centrally between two radial longitudinal ribs of the core, the retaining collar 7 is provided with recesses 25 to match the ends of the ribs.

If sleeve valves are partly closed the possibility is existing that the sleeve will flutter, that is to say will vibrate, whereby the fluid stream through the valve is disturbed. Particularly in control valves which may be in a partly closed condition for longer periods of time said vibrating is onerous.

Figure 7:
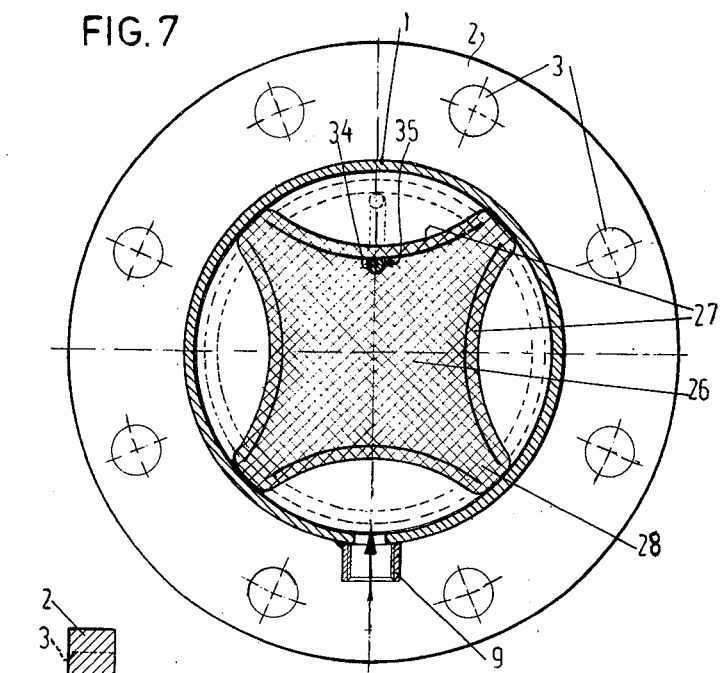
FIG. 7 shows a cross-section through a sleeve valve in again a modified embodiment.
Figure 8:
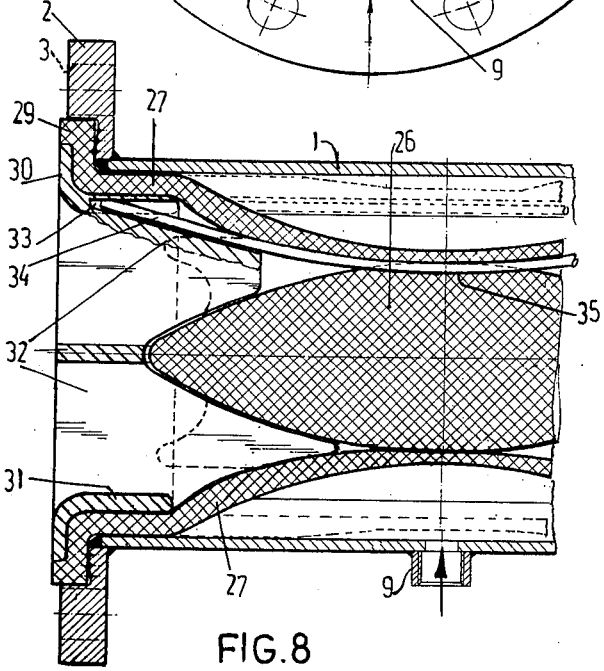
FIG. 8 shows part of a longitudinal section through the valve of FIG. 7.

The presence of the fins opens a possibility of removing said objections, as depicted in FIGS. 7 and 8, by providing two corresponding fins 32 at both ends of the valve with a recess 33 at the side remote from the core 26 and adjoining the sleeve 27. Said recesses are in the same radial plane and extending in longitudinal direction to the core. In each recess 33 one end of a straight bar 34 of stainless spring steel is loosely accommodated. The bar 34 has a circular cross section but may be flat too. The bar is extending through the space between the core 26 and the sleeve 27. Said sleeve 27 is connected to the core 26 by means of longitudinal ribs 28 and is mounted in the valve by thicker parts 29 thereof serving as seals. The fins 32 are arranged on a gland 30 having a cylindrical retaining collar 31 on its inner periphery.

In FIG. 7 and 8 the valve is shown in its closed state, the opened state being indicated by dotted lines.

If the valve closes, the sleeve moves the bar 34 radially inwardly and to this end a longitudinal recess 35 has been arranged in the central part of the core 26.

FIG. 8 only shows part of the valve, though the right hand part of said figure is the reflected image of the left hand part as shown. It is evident that instead of one bar 34 between each pair of corresponding fins 32 a bar 34 can be arranged. In most events only one bar 34 is sufficient for preventing fluttering of the sleeve.

What we claim is:

1. A sleeve valve comprising a torpedo shaped core provided with radial longitudinal ribs which extend substantially the full length of said core, a generally cylindrical sleeve surrounding said core and made from a material being elastically deformable in a radial direction and a generally cylindrical housing against which the sleeve is sealed at both ends, the radial extent of said ribs being such as to maintain portions of said sleeve in close proximity to the inner surface of said housing along the full lengths of such ribs, characterized in that between each end of the sleeve and the corresponding end of the core at least two approximately radial fins are provided, each one located between two longitudinal ribs of the core, said fins presenting inner end edges which incline inwardly from adjacent corresponding ends of said housing toward and at least substantially to portions of the core which are spaced inwardly from the ends thereof whereby the contours of the fins facing the sleeve approximately correspond to the shape the sleeve has in its normally closed state wherein the sleeve engages the core and fins.

2. A sleeve valve as claimed in claim 1, characterized in that the fins are arranged at one end on a gland provided with a cylindrical retaining collar for the sleeve, whereas the other ends of the fins are not connected with the core.

3. A sleeve valve as claimed in claim 2, characterized in that the fins are centrally united for supporting the core.

4. A sleeve valve as claimed in claim 1, characterized in that the contours of the fins facing the sleeve are at an angle of about 15° to 60° to the centre line of the valve.

5. A sleeve valve as claimed in claim 4, characterized in that the sides of the fins facing the sleeve are at an angle of about 40° to 50° to the centre line of the valve.

6. A sleeve valve as claimed in claim 1, characterized in that in at least two fins in corresponding positions relatively to the core and at both ends of the valve are recessed at the side remote from the core and adjoining the sleeve, each of said recesses accommodating an extremity of a practically straight bar of resilient material, said bar extending in the space between the core and the sleeve.

7. A sleeve valve as claimed in claim 6, characterized in that the core radially inward from each bar is provided with a longitudinal recess for accommodating the central part of the bar if the valve is closed.

8. A sleeve valve as claimed in claim 6, characterized in that the bar is made of stainless spring steel.

9. A supporting member for a sleeve valve characterized by a gland provided with a cylindrical retaining collar and a plurality of centrally united fins radially fastened thereto at regular intervals, whose sides remote from the gland are at an angle of about 40° to 50° to the centre line of the cylindrical retaining collar, characterized in that at least one of the fins on its radially outwardly directed side is provided with a longitudinal recess.

10. A sleeve valve comprising, in combination:
a generally cylindrical housing having a generally cylindrical sleeve therein;
a core disposed within said sleeve, said core being of a length slightly less than that of said sleeve and comprising an elongate body portion of generally torpedo shape and having a plurality of circumferentially spaced, radially projecting ribs which extend substantially the full length of said body portion, the radial extent of said ribs being such as to maintain portions of said sleeve in close proximity to the inner surface of said housing;
a gland member disposed at each end of said housing and maintaining the opposite ends of said sleeve in contact with the inner surface of said housing at each end thereof;
a plurality of radial supports extending between each gland and a corresponding end of said body portion, said supports being circumferentially staggered with respect to said ribs and each support presenting an inwardly facing, narrow supporting face which inclines inwardly from adjacent a corresponding end of the housing toward said body portion;
said sleeve being formed of elastically deformable material and being dimensioned such that when in essentially relaxed condition it may lie closely in contact with the outer peripheral surface of said core ribs; and
means for pressurizing the region between said inner surface of the housing and the outer surface of said sleeve.

11. A sleeve valve as defined in claim 10 wherein at least some of said radial supports are integral with said body portion.

12. A sleeve valve as defined in claim 10 wherein at least some of said radial supports are integral with said gland members.

13. A sleeve valve as defined in claim 12 including means interlockingly engaging said core with said gland members to maintain said radial supports in said circumferentially staggered relation to said ribs.

* * * * *

UNITED STATES PATENT AND TRADEMARK OFFICE
CERTIFICATE OF CORRECTION

PATENT NO. : 4,023,772

DATED : May 17, 1977

INVENTOR(S) : Johannes Bernadus Ratelband

It is certified that error appears in the above-identified patent and that said Letters Patent are hereby corrected as shown below:

[73] Assignee: Inter-Ocean N.V., Willemstad, Curacao/Antilles, Netherlands

Signed and Sealed this sixteenth Day of August 1977

[SEAL]

Attest:

RUTH C. MASON
Attesting Officer

C. MARSHALL DANN
Commissioner of Patents and Trademarks